US012533967B2

(12) United States Patent
Baker et al.

(10) Patent No.: US 12,533,967 B2
(45) Date of Patent: Jan. 27, 2026

(54) SYSTEM AND METHOD FOR IMPLEMENTING A NEUTRAL STATE IN MULTI-RATIO ELECTRIC DRIVE MODULE

(71) Applicant: FCA US LLC, Auburn Hills, MI (US)

(72) Inventors: Dean Baker, Rochester Hills, MI (US); Siraj Siddiqui, LaSalle (CA)

(73) Assignee: FCA US LLC, Auburn Hills, MI (US)

( * ) Notice: Subject to any disclaimer, the term of this patent is extended or adjusted under 35 U.S.C. 154(b) by 162 days.

(21) Appl. No.: 18/513,720

(22) Filed: Nov. 20, 2023

(65) Prior Publication Data

US 2025/0162429 A1  May 22, 2025

(51) Int. Cl.
*B60L 15/20* (2006.01)

(52) U.S. Cl.
CPC ....... *B60L 15/2036* (2013.01); *B60L 15/2054* (2013.01); *B60L 2240/423* (2013.01); *B60L 2260/20* (2013.01)

(58) Field of Classification Search
None
See application file for complete search history.

(56) References Cited

U.S. PATENT DOCUMENTS

| 11,904,684 | B2 * | 2/2024 | Park | B60L 15/20 |
| 2018/0119784 | A1 * | 5/2018 | Cui | F16H 57/0441 |
| 2022/0373067 | A1 * | 11/2022 | Shim | B60K 1/00 |

* cited by examiner

*Primary Examiner* — Todd Melton
(74) *Attorney, Agent, or Firm* — Jeremy J. Klobucar

(57) ABSTRACT

An electrified powertrain for an electrified vehicle includes a first electric drive module (EDM), a second EDM and a controller. The first EDM includes a first electric motor. A first gearbox transfers first drive torque from the first EDM to drive first drive wheels. The second EDM includes a second electric motor. A second gearbox transfers second drive torque from the second EDM to drive second drive wheels. The second gearbox has first and second clutches that provide two distinct gear ratios. The controller operates the electrified powertrain in (i) a normal drive mode wherein drive torque is commanded from the first and second electric motors, and a (ii) neutral drive mode wherein the clutches are commanded to an open position whereby the second drive torque is disconnected from the second drive wheels and drive torque is commanded from only the first EDM.

16 Claims, 4 Drawing Sheets

SYSTEM AND METHOD FOR IMPLEMENTING A NEUTRAL STATE IN MULTI-RATIO ELECTRIC DRIVE MODULE

FIELD

The present application relates generally to electric drive modules for electric vehicles and, more particularly, to a system and method for implementing a neutral state on an electric drive module for an electrified vehicle.

BACKGROUND

Some electrified vehicles are configured with two electric drive modules, one for delivering toque to a front axle and one for delivering torque to a rear axle for operating the vehicle in all-wheel drive. In some driving conditions it may not be necessary to operate both of the EDM's. In this regard, by powering the vehicle with only one EDM, a reduction of battery usage and a reduction of component wear associated with the unpowered EDM can be realized. Some current systems employ wheel end disconnect systems that can disconnect an EDM from a driveline. However, incorporating wheel end disconnect systems or other hardware can add additional cost, mass and complexity. Accordingly, while such dual EDM configurations work well for their intended purpose, there is a desire for improvement in the relevant art.

SUMMARY

In accordance with one example aspect of the invention, an electrified powertrain for an electrified vehicle includes a first electric drive module (EDM), a second EDM and a controller. The first EDM includes a first electric motor that generates first drive torque. A first gearbox transfers the generated first drive torque to drive first drive wheels. The second EDM includes a second electric motor that generates second drive torque. A second gearbox transfers the generated second drive torque to drive second drive wheels. The second gearbox has first and second clutches that provide two distinct gear ratios. The controller operates the electrified powertrain in (i) a normal drive mode wherein electric torque is commanded from the first and second electric motors, and a (ii) neutral drive mode wherein the first and second clutches are commanded to an open position whereby the second drive torque is disconnected from the second drive wheels and drive torque is commanded from only the first EDM.

In examples, the first gearbox is a single speed fixed gearbox. The controller determines whether conditions in the second gearbox can support the neutral drive mode.

In addition to the foregoing, the controller requests 100% drive torque to the first electric motor and 0% drive torque to the second electric motor in the neutral drive mode.

In addition to the foregoing, the first electric drive module is configured on a front axle of the electrified vehicle and the second electric drive module is configured on a rear axle of the electrified vehicle.

In addition to the foregoing, the controller is configured to receive a temperature of the second electric motor, compare the received temperature to a temperature threshold, and exit the neutral drive mode and return to the normal drive mode based on the received temperature exceeding the temperature threshold.

In examples, the controller is configured to receive a back electromotive force (BEMF) of the second electric motor, compare the BEMF to a BEMF threshold, and exit the neutral mode and return to the normal drive mode based on the BEMF exceeding the BEMF threshold.

In other examples, the controller is configured to receive an acceleration request, compare the acceleration request to an acceleration threshold, and exit the neutral drive mode and return to the normal drive mode based on the acceleration request exceeding the acceleration request threshold.

In examples, one of the first and second clutches is a selectable one-way clutch and the other of the first and second clutches is a friction clutch.

In accordance with one example aspect of the invention, a method for operating an electrified powertrain on an electrified vehicle is provided. A request is received for operating the electrified powertrain in a neutral drive mode, the electrified powertrain comprising (i) a first electric drive module having a first electric motor that generates a first drive torque and a first gearbox that transfers the generated first drive torque to drive first drive wheels; and (ii) a second electric drive module having a second electric motor that generates a second drive torque and a second gearbox that transfers the generated first drive torque to drive second drive wheels, the second gearbox having a first clutch and a second clutch that cooperate to provide at least two distinct gear ratios to the second drive wheels. The first and second clutches are commanded to an open position whereby the second drive torque is disconnected from the second drive wheels. The drive torque is commanded from only the first electric drive module to power the electrified vehicle.

In examples, the method further includes determining whether conditions in the second gearbox can support the neutral drive mode. Commanding drive torque from only the first electric drive module includes requesting 100% drive torque to the first electric motor; and requesting 0% drive torque to the second electric motor.

In addition to the foregoing, the method includes receiving a temperature of the second electric motor, comparing the received temperature to a temperature threshold, and exiting the neutral drive mode and returning to the normal drive mode based on the received temperature exceeding the temperature threshold.

In examples, the method includes receiving a back electromotive force (BEMF) of the second electric motor, comparing the BEMF to a BEMF threshold, and exiting the neutral mode and returning to the normal drive mode based on the BEMF exceeding the BEMF threshold.

In other examples, the method includes receiving an acceleration request, comparing the acceleration request to an acceleration threshold, and exiting the neutral drive mode and returning to the normal drive mode based on the acceleration request exceeding the acceleration request threshold.

In examples, one of the first and second clutches is a selectable one-way clutch and the other of the first and second clutches is a friction clutch.

In additional examples, the first electric drive module is configured on a front axle of the electrified vehicle and the second electric drive module is configured on a rear axle of the electrified vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for an electric drive module (EDM) assembly of an electric vehicle (EV). The electrified powertrain includes a front EDM and a rear EDM configured for use in an all-wheel drive electrified vehicle. A controller determines whether a neutral state operating mode is requested of the electrified powertrain based on customer input and/or operating conditions. A neutral state operating mode is defined as no load delivered from the rear EDM (e.g., no input torque, no input speed). In the neutral state operating mode, all drive torque for the vehicle is provided by the front EDM. In the neutral state operating mode, efficiencies are realized such as in a reduction of battery usage and a reduction of component wear associated with the rear EDM. In this regard, battery range and hardware life can be improved when implementing the neutral state operating mode.

Figure 1:
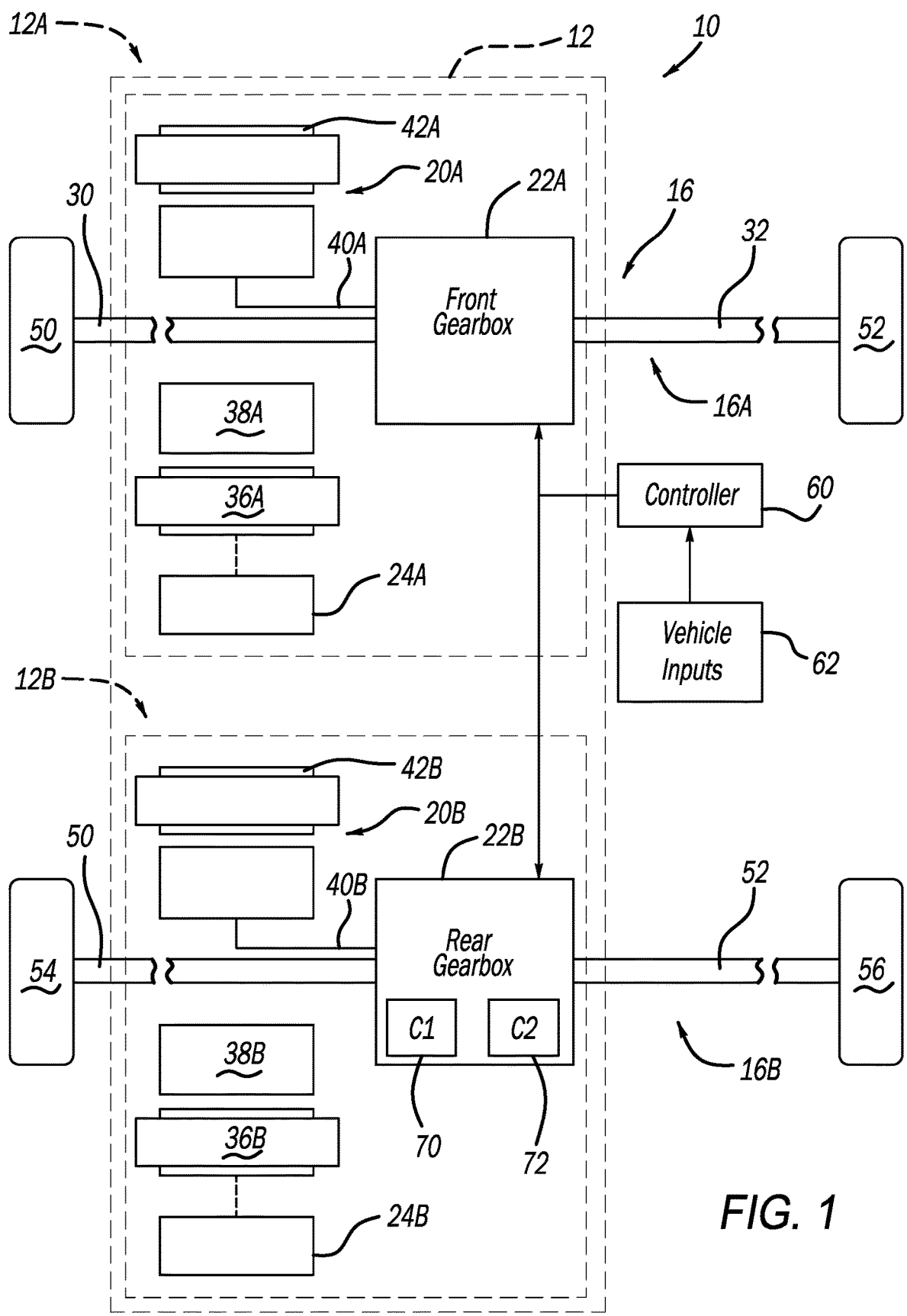
FIG. 1 is a schematic illustration of an example electric vehicle drivetrain having an electric drive module (EDM) assembly including a front EDM and a rear EDM for use in an all-wheel drive electrified vehicle, in accordance with the principles of the present application.

With initial reference to FIG. 1, an electrified vehicle 10 is partially shown in accordance with the principles of the present disclosure. In the example embodiment, vehicle 10 includes an electrified powertrain 12 configured to generate and transfer drive torque to a driveline 16 for vehicle propulsion. The electrified powertrain 12 generally includes a first EDM 12A and a second EDM 12B. For purposes of this discussion the first EDM 12A will be referred to as the front EDM 12A that provides drive torque to front drive axles 30, 32 and front drive wheels 50, 52. Similarly, the second EDM 12B will be referred to as the rear EDM 12B that provides drive torque to rear drive axles 51, 53 and rear drive wheels 54, 56. It will be appreciated that in other implementations, the first and second EDM's 12A and 12B may be swapped.

The first EDM 12A includes a first drive motor 20A, a first electric drive gearbox assembly 22A, and first power electronics including a power inverter module (PIM) 24A. The first electric motor 20A is selectively connectable via the PIM 24A to a high voltage battery system (not shown) for powering the first electric motor 20A. The first gearbox assembly 22A is configured to transfer the generated drive torque to a front driveline 16A, including the front drive axles 30, 32 and front drive wheels 50, 52. In examples, the first gearbox assembly 22A can be configured as a single speed, fixed gearbox. In the example shown, the first electric motor 20A generally includes a first stator 36A, a first rotor 38A, and a first rotor output shaft 40A.

The second EDM 12B includes a second drive motor 20B, a second electric drive gearbox assembly 22B, and second power electronics including a power inverter module (PIM) 24B. The second electric motor 20B is selectively connectable via the PIM 24B to a high voltage battery system (not shown) for powering the second electric motor 20B. The second gearbox assembly 22B is configured to transfer the generated drive torque to a rear driveline 16B, including the rear drive axles 51, 53 and rear drive wheels 54, 56. In examples, the second gearbox assembly 22B is a multi-speed gearbox and includes a first clutch 70 and a second clutch 72 that cooperate to engage gears to provide first and second gear ratios at the rear gearbox 22B. The first clutch 70 can be a selectable one-way clutch (SOWC) while the second clutch 72 can be a friction clutch. Other configurations are contemplated. In the example, shown, the second electric motor 20B generally includes a second stator 36B, a second rotor 38B, and a second rotor output shaft 40B.

A controller 60 can send signals to the front and rear gearboxes 22A, 22B. While a single controller 60 is shown for illustrative purposes, it will be appreciated that a dedicated controller can be provided for each of the first EDM 12A and the second EDM 12B. The controller 60 receives various inputs 62 and sends signals to the first and second gearboxes 12A, 12B based on the inputs 62. The inputs 62 can include, but are not limited to, a commanded torque, a selected gear (Sg), a drag torque (Td), an electric motor revolutions per minute (RPM) (Sem), a wheel RPM (Sw), a gearbox gear ratio in gear x (Nx), an electric motor temperature (Tth), and an electric motor back electromotive force (BEMF). As will be explained herein, the controller 60 can compare various vehicle inputs to stored threshold values including, but not limited to, an electric motor threshold temperature Tth and an electric motor back EMF threshold (BEMFth) and make decisions as to whether the neutral operating mode should be exited. Back EMF can be created as a result of the second clutch 72 (configured as a friction clutch) being disengaged (open) but still causing drag.

Figure 2A:
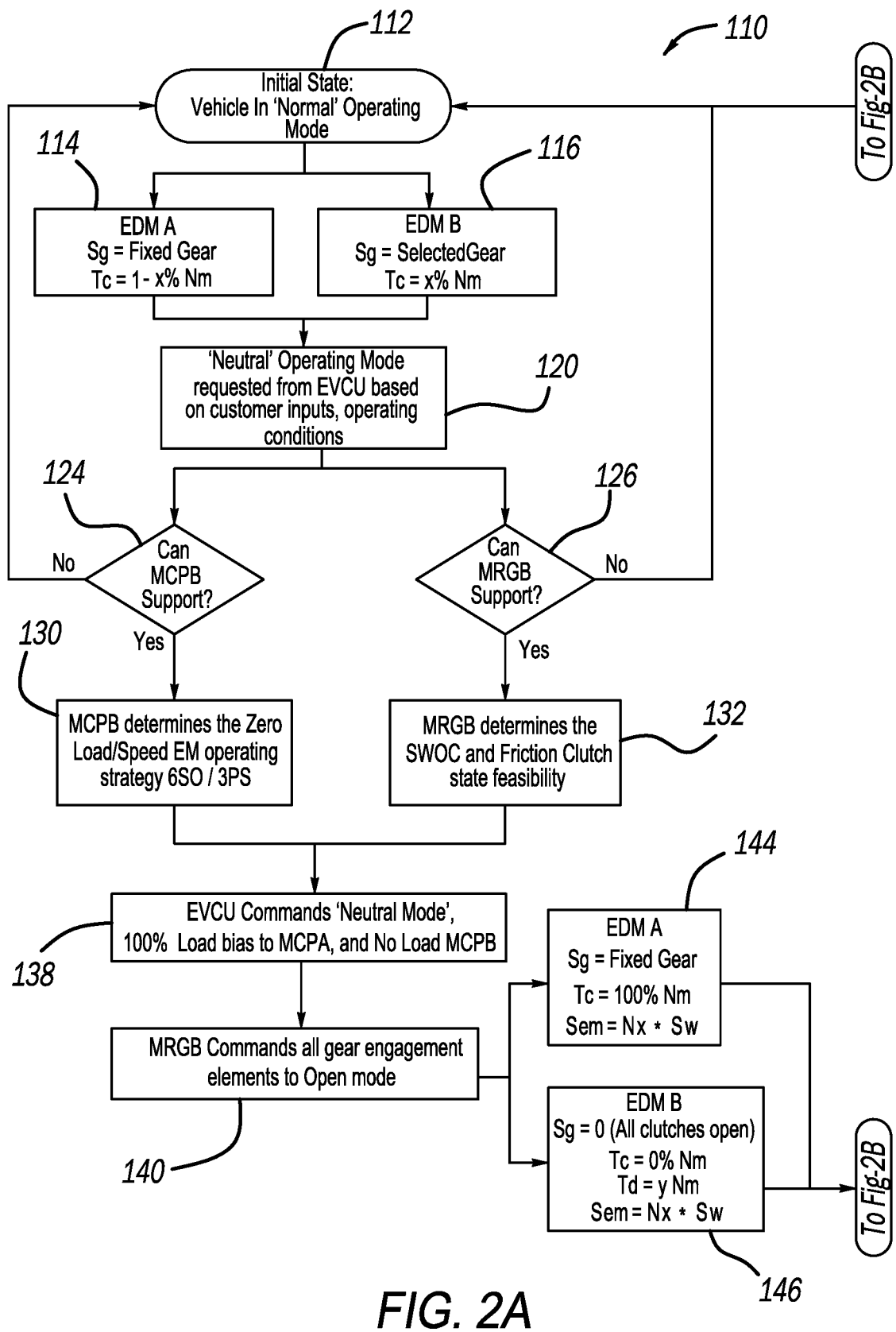
FIGS. 2A and 2B are a logic flowchart illustrating a method of implementing a neutral state on the electrified powertrain shown in FIG. 1, in accordance with the principles of the present application.
Figure 2B:
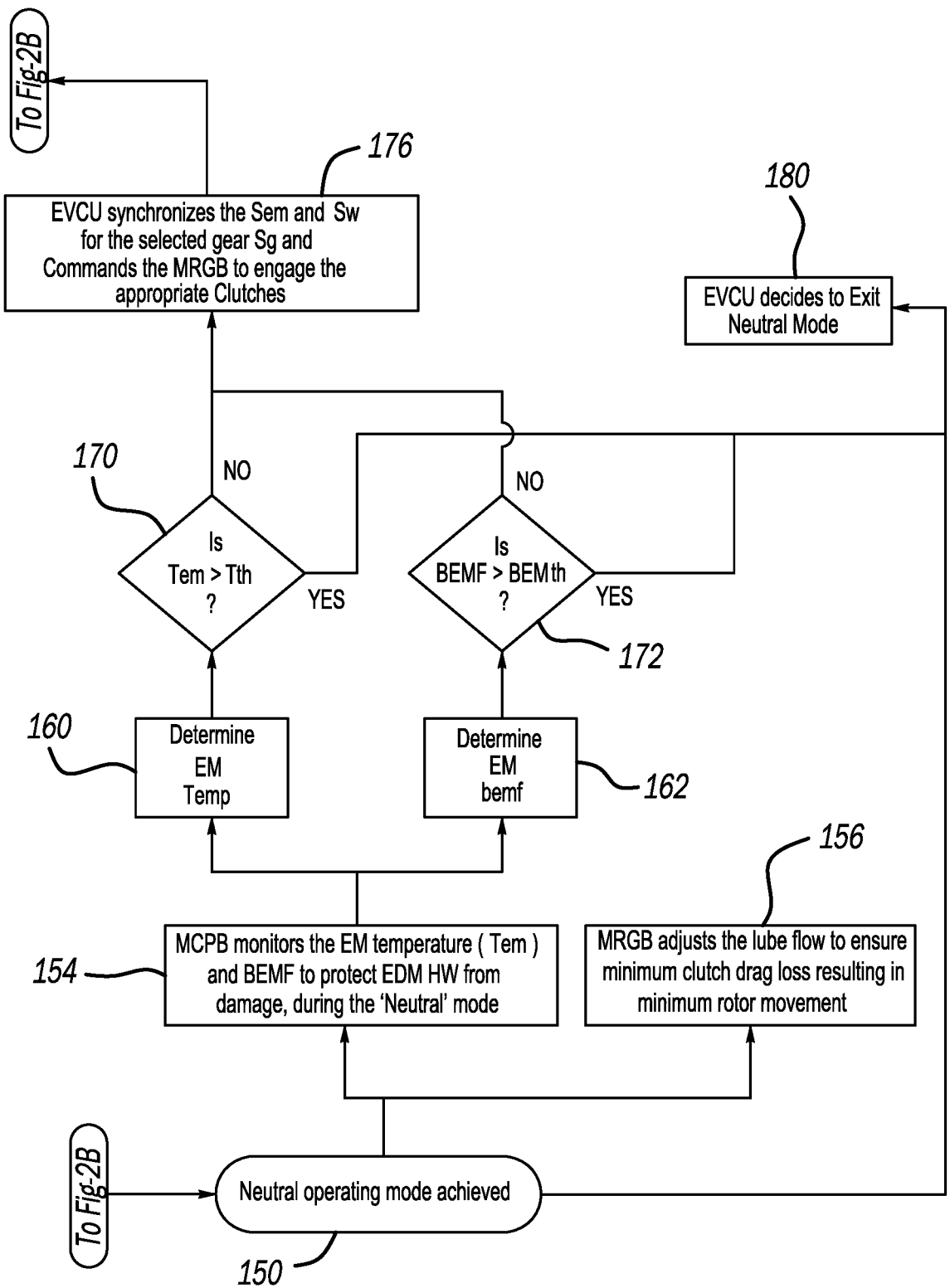

With additional reference now to FIGS. 2A and 2B, a method 110 of implementing a neutral state on the electrified powertrain 12 shown in FIG. 1, in accordance with the principles of the present application will be described. At 112 control is running the electrified vehicle 10 in an initial state where the vehicle is operating in a "normal" all-wheel drive mode. At 114, control sends a torque request to the first EDM 12A. As explained above, the first EDM 12A includes a single speed fixed gearbox 22A. The commanded torque can be Tc=1−x % Nm. At 116, control sends a torque request to the second EDM 12B. As explained above, the second EDM 12B includes a multispeed gearbox 22B. The commanded torque can be Tc−x % Nm.

At 120, control determines that a neutral operating mode is requested based on customer inputs and/or operating conditions. At 124, control determines whether the motor controller (such as the controller 60 or a dedicated controller associated with the second motor 20B) can support the neutral operating mode request. Various operating conditions, such as, but not limited to, a temperature of the electric motor 20B must be satisfied. If not, control loops to 112. If yes, control proceeds to 130 where the motor controller associated with the second motor 20B determines the Zero load/speed electric motor operating strategy. At 126, control determines whether the rear gearbox 22B can support the neutral operating mode request. If not, control loops to 112.

If yes, control proceeds to 132 where control determines the feasibility of the first clutch 70 and the second clutch 72 in the rear gearbox 22B. In other words, control determines whether the clutches 70, 72 can support a shift to the neutral operating mode.

At 138, the controller 60 commands the neutral mode including 100% load bias to the first electric motor 20A and no load to the second electric motor 20B. At 140, control commands the rear gearbox 22B to the open mode. In the open mode, all gear engagement elements in the rear gearbox 22B are in an open state. The method implemented by the instant disclosure takes advantage of the multi-clutch gearbox 22B to achieve a neutral state, without requiring extra hardware such as wheel end disconnect systems that can add additional cost, mass and complexity. Explained further, by moving both of the clutches 70, 72 to open, the motor 20B is placed into a neutral state where no torque input is communicated from the motor 20B to the rear drivetrain 16B. Gearbox losses resulting from various components (gears, etc.) rotating are also minimized gaining efficiencies. It will be appreciated that if the controller 60 merely commands zero torque from the motor 20B (without disconnecting the rear gearbox 22B), losses (rotating masses, drag, etc.) will still be present from the rotating components of the gearbox 22B.

At 144, the first EDM 12A includes commanded torque of 100% Nm and an electric motor 20A RPM of Nx*Sw. At 146, the second EDM 12B includes commanded torque of 0% Nm, a drag toque of y NM and an electric motor 20B RPM of Nx*Sw. At 150, control confirms the neutral operating mode has been achieved.

Once in neutral mode, control determines exit conditions for exiting neutral mode. At 154, control monitors the temperature (Tem) of the electric motor 20B and the electric motor back EMF to protect the electric motor 20B from damage (e.g., due to overheating) while in the neutral mode. As can be appreciated, the electric motor 20B can still get hot while in a regeneration mode (even if supplying no input torque) as the rotor 38B can still be rotating (due to wheel motion of wheels 54, 56 and drag toque). At 160, control determines a temperature of the electric motor 20B. At 170, control exits neutral mode if it is determined that the temperature of the electric motor 20B exceeds a temperature threshold. At 162, control determines an electric motor back EMF. At 172, control exits neutral mode if it is determined that the back EMF exceeds a back EMF threshold. At 176, control synchronizes the Sem and the Sw for the selected gear Sg and commands the rear gearbox 22B to engage the appropriate clutches 70, 72.

At 180, control determines to exit the neutral mode. Control can determine to exit neutral due to a drive torque demand (e.g., high acceleration requested requiring torque inputs from both of the motors 20A, 20B). In examples, control can compare an acceleration request to an acceleration request threshold. If the acceleration request exceeds the acceleration request threshold, control can exit the neutral drive mode. At 156 the rear gearbox 22B adjusts the lube flow to ensure minimum clutch drag loss resulting in minimum rotor movement.

Figure 3:
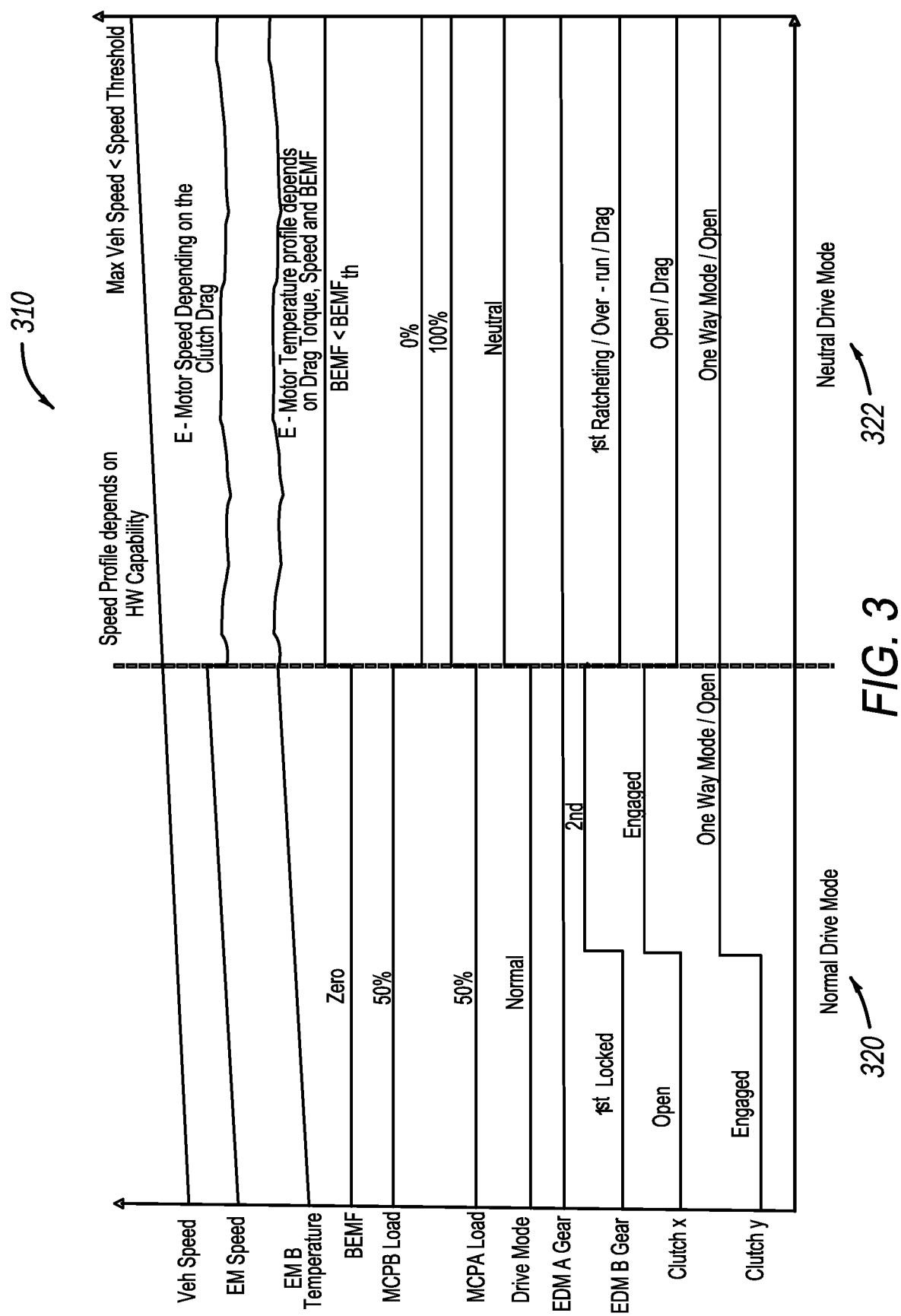
FIG. 3 is a chart illustrating a neutral state diagram for normal and neutral drive modes the system and method described in FIGS. 1 and 2A-2B, in accordance with the principles of the present application.

With additional reference now to FIG. 3, a chart 310 illustrating a neutral state diagram for normal and neutral drive modes the system and method described in FIGS. 1 and 2A-2B will be described. Various traces for normal drive mode (all-wheel drive) are shown at 320. Various traces for neutral mode (rear motor 20B disconnected from torque input) are shown at 322.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain for an electrified vehicle, the electrified powertrain comprising:
   a first electric drive module comprising:
      a first electric motor that generates first drive torque; and
      a first gearbox that transfers the generated first drive torque to drive first drive wheels;
   a second electric drive module comprising:
      a second electric motor that generates second drive torque; and
      a second gearbox that transfers the generated second drive torque to drive second drive wheels, the second gearbox configured as a multi-speed gearbox having a first clutch and a second clutch that cooperate to provide at least two distinct gear ratios to the second drive wheels; and
   a controller that selectively and alternatively operates the electrified powertrain in (i) a normal drive mode wherein drive torque is commanded from the first and second electric motors, and a (ii) neutral drive mode wherein the first and second clutches are commanded to an open position whereby the second drive torque is disconnected from the second drive wheels and drive torque is commanded from only the first electric drive module, wherein the controller determines whether conditions in the second gearbox can support the neutral drive mode.

2. The electrified powertrain of claim 1, wherein the first gearbox is a single speed fixed gearbox.

3. The electrified powertrain of claim 1, wherein the controller requests 100% drive torque to the first electric motor and 0% drive torque to the second electric motor in the neutral drive mode.

4. The electrified powertrain of claim 1, wherein the first electric drive module is configured on a front axle of the electrified vehicle and the second electric drive module is configured on a rear axle of the electrified vehicle.

5. The electrified powertrain of claim 1, wherein the controller is configured to:

receive a temperature of the second electric motor;
compare the received temperature to a temperature threshold; and
exit the neutral drive mode and return to the normal drive mode based on the received temperature exceeding the temperature threshold.

6. The electrified powertrain of claim 1, wherein the controller is configured to:
receive a back electromotive force (BEMF) of the second electric motor;
compare the BEMF to a BEMF threshold; and
exit the neutral drive mode and return to the normal drive mode based on the BEMF exceeding the BEMF threshold.

7. The electrified powertrain of claim 1, wherein the controller is configured to:
receive an acceleration request;
compare the acceleration request to an acceleration threshold; and
exit the neutral drive mode and return to the normal drive mode based on the acceleration request exceeding the acceleration request threshold.

8. The electrified powertrain of claim 1, wherein one of the first and second clutches is a selectable one-way clutch and the other of the first and second clutches is a friction clutch.

9. A method for operating an electrified powertrain on an electrified vehicle, the method comprising:
receiving a request for operating the electrified powertrain in a neutral drive mode, the electrified powertrain comprising (i) a first electric drive module having a first electric motor that generates a first drive torque and a first gearbox that transfers the generated first drive torque to drive first drive wheels; and (ii) a second electric drive module having a second electric motor that generates a second drive torque and a second gearbox that transfers the generated first drive torque to drive second drive wheels, the second gearbox having a first clutch and a second clutch that cooperate to provide at least two distinct gear ratios to the second drive wheels;
commanding the first and second clutches to an open position whereby the second drive torque is disconnected from the second drive wheels;
commanding drive torque from only the first electric drive module to power the electrified vehicle;
receiving a temperature of the second electric motor;
comparing the received temperature to a temperature threshold; and
exiting the neutral drive mode and return to the normal drive mode based on the received temperature exceeding the temperature threshold.

10. The method of claim 9, further comprising:
determining whether conditions in the second gearbox can support the neutral drive mode.

11. The method of claim 9, wherein commanding drive torque from only the first electric drive module comprises:
requesting 100% drive torque to the first electric motor; and
requesting 0% drive torque to the second electric motor.

12. The method of claim 9, further comprising:
receiving a back electromotive force (BEMF) of the second electric motor;
comparing the BEMF to a BEMF threshold; and
exiting the neutral drive mode and return to the normal drive mode based on the BEMF exceeding the BEMF threshold.

13. The method of claim 9, further comprising:
receiving an acceleration request;
comparing the acceleration request to an acceleration threshold; and
exiting the neutral drive mode and return to the normal drive mode based on the acceleration request exceeding the acceleration request threshold.

14. The method of claim 9 wherein one of the first and second clutches is a selectable one-way clutch and the other of the first and second clutches is a friction clutch.

15. The method of claim 9, wherein the first electric drive module is configured on a front axle of the electrified vehicle and the second electric drive module is configured on a rear axle of the electrified vehicle.

16. An electrified powertrain for an electrified vehicle, the electrified powertrain comprising:
a first electric drive module comprising:
a first electric motor that generates first drive torque; and
a first gearbox that transfers the generated first drive torque to drive first drive wheels;
a second electric drive module comprising:
a second electric motor that generates second drive torque; and
a second gearbox that transfers the generated second drive torque to drive second drive wheels, the second gearbox configured as a multi-speed gearbox having a first clutch and a second clutch that cooperate to provide at least two distinct gear ratios to the second drive wheels; and
a controller that selectively and alternatively operates the electrified powertrain in (i) a normal drive mode wherein drive torque is commanded from the first and second electric motors, and a (ii) neutral drive mode wherein the first and second clutches are commanded to an open position whereby the second drive torque is disconnected from the second drive wheels and drive torque is commanded from only the first electric drive module, wherein the controller is configured to: receive a back electromotive force (BEMF) of the second electric motor; compare the BEMF to a BEMF threshold; and exit the neutral drive mode and return to the normal drive mode based on the BEMF exceeding the BEMF threshold.

\* \* \* \* \*